May 5, 1959 F. T. HAAS 2,885,620
ANTENNA DRIVE MOTOR CONTROL SYSTEM
Filed June 5, 1956 3 Sheets-Sheet 1

INVENTOR,
FRANK T. HAAS.
BY
Harry M. Saragovitz
ATTORNEY.

FIG. 2

INVENTOR.
FRANK T. HAAS
BY
Harry M. Saragovitz
ATTORNEY

United States Patent Office 2,885,620
Patented May 5, 1959

2,885,620
ANTENNA DRIVE MOTOR CONTROL SYSTEM
Frank T. Haas, Sarasota, Fla.

Application June 5, 1956, Serial No. 589,566

12 Claims. (Cl. 318—286)

(Granted under Title 35, U.S. Code (1952), sec. 266)

The invention described herein may be manufactured and used by or for the Government for governmental purpose, without the payment of any royalty thereon.

The invention relates to radar or other pulse-reflection type object locating systems, and particularly to antenna scan control apparatus for use in such systems.

Although the apparatus of the invention is applicable to many such systems, it will be illustrated and described as applied to a particular air search radar system for which it was designed and with which it was used. This system is adapted for detecting aircraft or other objects (targets) at ranges up to about 160 nautical miles and for locating them in terms both of azimuth and range. It is similar to most search radar equipments that consist in general of a modulator, transmitter-receiver, rotatable antenna and an indicator unit including P.P.I.- and A-scopes and associated sweep control and range selection apparatus. In this system the search antenna has a swing circle 15.25 feet in diameter and is normally adapted to be rotated in either direction at constant speed over an angle of 360 degrees.

It is frequently desirable in such systems to limit the scan of the rotating antenna to a relatively small sector of the 360-degree range available so as to avoid wasting time on the searching of areas believed to be of no interest, and at times also to change the direction, angle and speed of scan so as to shift quickly the scan to a restricted area of particular interest and to search that area slowly and other areas of presumably lesser interest more rapidly in each direction.

A general object of the invention is to improve the scanning control arrangements of a radar or other pulse reflection type object locating system so as to enable the above-mentioned desirable results to be obtained simply, efficiently and economically.

Another object is to enable the oscillatory scanning by the antenna in a radar system alternatively through a full 360-degree angle and through any desired small sector of that angle, at the will of the radar operator.

A more specific object is to improve the antenna control circuits of a radar system so as to enable the direction, speed and angle (width) of scan by the antenna to be quickly changed under control of the radar operator. A related object is to enable the direction, speed and width of scan of an antenna in such a radar system to be changed quickly by the radar operator without risk of damage to the antenna or its associated circuits due to such operations.

Another object is to provide a more uniform control of the speed of rotation or oscillation of an antenna in a radar system.

The invention mainly resides in an improved unitary antenna scan control device which when attached to a radar or other pulse reflection-type object locating system will enable the operator thereof by adjustment of a few manual controls to provide clockwise and counter-clockwise rotation of the scanning antenna alternatively continuously over the full 360-degree available scan angle or over a sector of this angle of any desired angular width up to 180 degrees and at any desired rotation speed. In this device which in one embodiment includes an auxiliary sector scan motor, a plurality of cams, switches and relays and two control vacuum tubes connected in a particular circuit configuration, the arrangements for providing the required increase and decrease rates of speed are automatically fixed in the circuit, and a potentiometer control on the front panel of the device provides means for adjusting the sector scan width from zero to 180 degrees. Interlocking circuits built into the device serve to prevent damage to the antenna due to its operation. The wiring is such that once the antenna has started moving in either direction in the full 360-degree scan or in sector scan, the circuit is locked in that condition until the antenna has been brought to a stop either automatically as in sector scan or by switching off of the rotation. All power for this device is obtained from the azimuth-range indicator unit and all controlled circuits are wired to a terminal strip or block in this same unit.

A feature of the invention is the use of a vacuum tube with a resistance-condenser wave shaping and timing network in the biasing voltage supply for the control grid or grids thereof, in the antenna speed control circuit, to provide a more uniform (smoother) variation of speed.

The various features of the invention will be better understood from the following detailed description thereof when read in conjunction with the several figures of the drawing in which.

In the following description only those parts of the known system required for proper explanation of the invention are described in detail.

Figure 1:
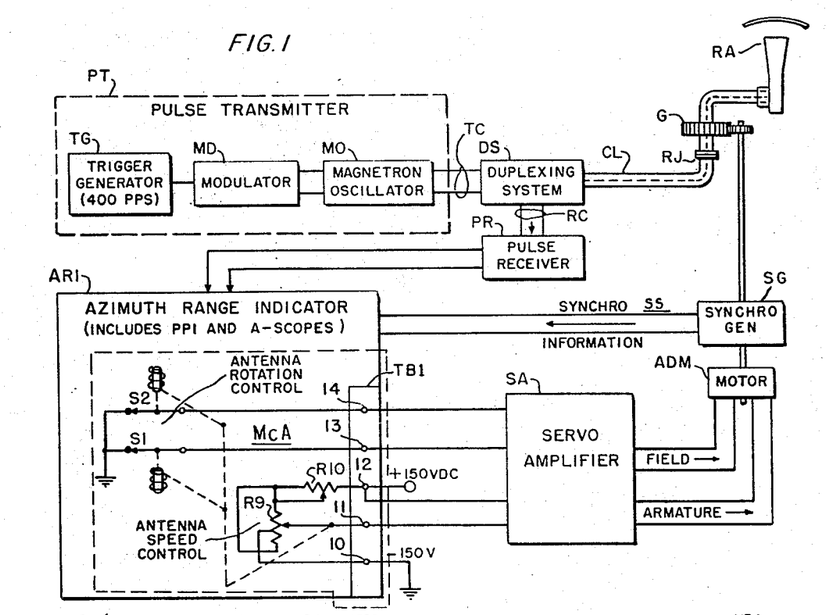
Fig. 1 shows in block diagrammatic form the circuit of one known type of radar system to which the invention may be applied.

Referring to Fig. 1, the radar system shown includes a transmitting circuit TC and a receiving circuit RC connected to a rotatable antenna RA through the duplexing system DS and the common coaxial line link CL. The antenna RA is of the reflector section, parabolic type employing a waveguide horn as the primary radiator, as shown diagrammatically. The duplexing system DS provided to enable the use of a common antenna for transmitting and receiving, may be in the form of an automatic transmit-receive switch of any of the known types, for example, one employing twin resonant cavities and associated TR-tubes, responsive to the application thereto of a portion of the necessarily high amplitude pulse energy outgoing to the antenna in transmitting intervals to provide a protective short-circuit across the input to the receiving circuit, and allowing in receiving intervals substantially all of the relatively low amplitude pulse energy received from the antenna to pass with little attenuation into the receiving circuit.

The pulse transmitter PT in the transmitting circuit TC includes a modulator MD which is triggered by a trigger generator TG, say at 400 pulses per second. The resulting pulses recurring at that rate are converted to R.-F. pulses in the magnetron oscillator MO and the R.-F. pulses are fed through the duplexing system DS and common coaxial line link CL to the antenna RA for radiation thereby into the surrounding air medium. The antenna RA rotates to scan the terrain for targets, information on its bearing and azimuth being relayed by a synchro system SS to the azimuth-range indicator ARI.

A rotating joint RJ in the coaxial link CL and the gearing G coupling the upper portion of that link above the joint, to the shaft of the antenna drive motor ADM provide means for enabling the antenna RA to be rotated in the horizontal plane at constant speed by that motor. In normal operation of the known system where the antenna RA is to be rotated through the full 360-degree search angle, the motor ADM is adapted to be operatively energized and controlled through the servo amplifier SA under control of the regular manual control apparatus MCA wired to a terminal strip or block TB1 located in or adjacent to the azimuth and range indicator ARI, in the manner to be described later.

Echo signals reflected from objects in the surrounding air medium on which the outgoing R-F radar pulses impinge, are picked up by the antenna RA during the interim periods between transmitted pulses and will be fed from that antenna through the common coaxial link CL and the duplexing system DS to the pulse receiver PR in the receiving circuit RC of the radar system. The receiver PR, which may be of conventional design containing the usual mixer, local oscillator, intermediate frequency amplifier, detector and video frequency amplifier (not shown), will operate to convert the applied R-F echo pulses into video pulses. These video pulses will be applied from the output of PR to the azimuth-range indicator ARI in which they will be displayed on both a P.P.I. and an A-scope each of which includes its own sweep control circuit and an individual range selector switch (not shown).

The horizontal sweep of the oscilloscope P.P.I. in the indicator ARI may be synchronized with the azimuth position of the rotating antenna RA by any suitable means, for example, by a synchro system SS, which may include a transmitting or synchro generator SG (as shown) mounted on the antenna RA and follower synchro apparatus (not shown) located in the indicator ARI, driven directly from the synchro generator SG.

Figure 2:
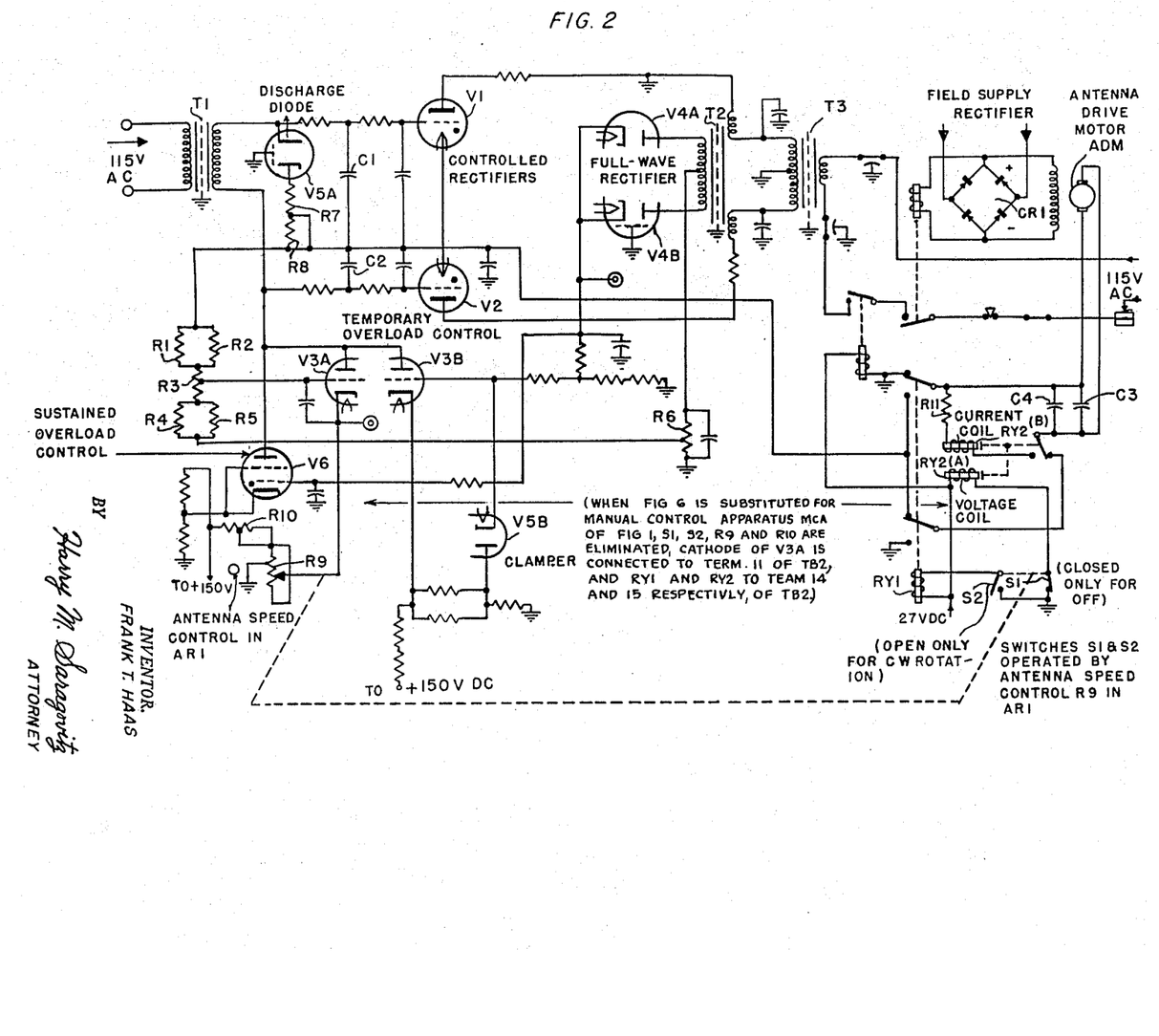
Fig. 2 shows schematically the circuit of a servo amplifier employed in the antenna control circuits of the known radar system of Fig. 1.

Fig. 2 shows the circuit of the servo amplifier SA used for controlling the operation of the antenna drive motor ADM and thus the rotation of the antenna RA in the known radar system of Fig. 1, and also employed in combination with the apparatus shown in Fig. 6 for providing alternatively the regular 360-degree antenna scan and sector scan in accordance with the invention as will be described later. In order to show more clearly how the equipment in the servo amplifier SA cooperates with other equipment, specifically the antenna drive motor ADM and the several controls in the manual control apparatus MCA in the azimuth-range indicator ARI to control the normal 360-degree scan in the system of Fig. 1, this other equipment is also shown in Fig. 2. As shown in Figs. 1 and 2, the manual control apparatus MCA comprises an antenna rotation control including the manual switches S1 and S2 respectively connected through the terminals 13 and 14 of the terminal block TB1 to the control relays RY2 and RY1 in the servo amplifier SA, and an antenna speed control including the speed control potentiometer R9, and the variable resistor R10 for setting the speed range over which the potentiometer R9 can be adjusted, connected through the terminals 10, 11 and 12 of the terminal block TB1 to the control tubes V3A and V6 in amplifier SA, and to a 150-volt D.-C. power source. As the specific circuits in the servo amplifier SA, as shown in Fig. 2, and the other circuits used for controlling the normal 360-degree scan in the known system shown in Fig. 1, are not the invention of applicant, in the following description they are defined only in sufficient detail to indicate how they cooperate with the circuits of the invention shown in Figs. 3, 5 and 6.

In general, in the radar system of Fig. 1 the servo amplifier SA controls the operation of the antenna RA by supplying the D.-C. field and armature voltages for the antenna drive motor ADM, and by controlling and regulating the speed of that motor in response to operation of the several controls in the manual control apparatus MCA associated with the terminals of the terminal block TB1 in the azimuth-range indicator ARI. Field excitation for the motor ADM is derived from a 115 volt, 400 cycle supply through a dry-disk rectifier. Control and regulation of the speed of the motor ADM is obtained by a bridge circuit controlling two thyratrons which develop the D.-C. armature voltage for the motor ADM. Relays are employed to perform the functions of starting and reversing the motor ADM, while vacuum tubes associated with the bridge circuit afford overload protection.

As shown in Fig. 2, the main components of the circuits for performing these functions consist of the field supply rectifier CR1 containing four dry-disk rectifiers connected in a bridge arrangement, bridge input transformer T1, control transformer T2, plate supply transformer T3, thyratron rectifiers V1 and V2, control tube V3A, current limiting tubes V3B and V6, full-wave rectifier V4A and V4B, discharge diodes V5A and D.-C. clamper tube V5B.

In operation, the amount of voltage applied to the armature of the antenna drive motor ADM is determined by the D.-C. component (bias) of the 400-cycle signal applied to the grids of the thyratrons V1 and V2. If the bias is made sufficiently high, V1 and V2 will not conduct during any portion of the A.-C. cycle, and no armature voltage for the motor ADM will be developed. As the bias is made more positive, V1 and V2 conduct for a small portion of each A.-C. cycle, and as the bias is made still more positive, V1 and V2 eventually conduct over a major portion of each half-cycle.

The V1 and V2 A.-C. grid signal and the D.-C. component of the 400-cycle signal used for biasing the thyratrons V1 and V2 are obtained from the secondary of transformer T1, the primary of which is supplied with 115 volts A.-C., the value of the D.-C. component being controlled by the triode V3A. Tube V3A is part of the bridge circuit consisting otherwise of resistors R1 through R6, diode V5A and resistors R7 and R8.

Initial bias to V3A is set by the antenna speed control potentiometer R9 (in indicator ARI) which adjusts the amount of positive voltage at the cathode of V3A. When the antenna RA is rotating, the grid of V3A also receives bias voltage from the bridge resistors R1–R5, and the potentiometer R6. The bias voltage developed by these resistors is controlled by output voltage and by output current which develops D.-C. voltage across R6.

The variable resistor R8 in the circuit of tube V5A is adjusted so that A.-C. grid signals on V1 and V2 are at the threshold of producing conduction in V1 and V2 when the antenna speed control potentiometer R9 (in the indicator ARI) is set at zero. When antenna speed control R9 is turned from zero, V3A receives an increment of negative bias, and hence the negative bias developed across the capacitors C1 and C2 is reduced. The most positive portion of the A.-C. component at the grids of V1 and V2 causes these thyratrons to fire on alternate halves of the cycle. As soon as any output voltage is developed by tubes V1 and V2, current flows through bridge resistors R1 through R6. The voltage appearing on the potentiometer R3 is applied as a bias to the grid of tube V3A. Assuming that the potentiometers R3 and R6 are properly adjusted, the output voltage and current each stabilize at some value and the antenna RA rotates at a speed commensurate with these values.

To limit the antenna drive motor armature current, the limiting circuits of tubes V3B, V5B and V6 are used. The circuit of V3B and V5B limits temporary overload currents, while the circuit of V6 limits sustained overload currents.

Reversal of antenna rotation is accomplished by relay RY1 which is operated by S2 and S1 associated with the mid-position of the antenna rotation control on the azimuth range indicator panel. The relay RY1 operates to reverse the output connections to the armature of the antenna drive motor ADM. Filter capacitors C3 and C4 are shunted across the output circuit to reduce the 400-cycle ripple voltage.

The single-pole, double throw contacts of relay RY2(A/B) operate to brake the antenna drive motor ADM. The voltage relay coil RY2(A) is energized when the antenna speed control R9 (on the azimuth-range indicator panel) is in its mid-position. This opens the circuit to the armature of motor ADM and also connects the relay current coil of RY2(B) in series with the resistor R11 across the drive motor armature. When the antenna speed control R9 is turned in either direction, relay RY2(A) is de-energized, the drive motor armature circuit is closed and relay RY2(B) and resistor R11 are disconnected. The antenna RA then immediately rotates according to the setting of the potentiometer R9, the speed being indicated by an antenna speed dial (not shown) associated therewith.

The position of the switch S2 (in the manual control apparatus MCA on the panel of the indicator ARI) determines the direction of rotation of the motor ADM and thus of the antenna RA by controlling the action of relay RY1. When switch S2 is open, clockwise rotation is obtained and when it is closed counter-clockwise rotation is obtained. Whenever the antenna RA is brought to a stop, switch S1 is closed controlling the operation of relay RY2 which causes the capacitors C3 and C4 to be discharged to remove any residual voltages which if allowed to remain might react with the next voltages applied to rotate the antenna.

Figure 3:
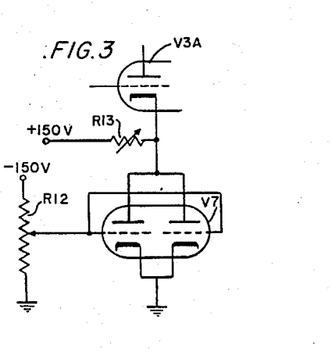
Figs. 3 and 5 respectively show schematically alternative arrangements in accordance with the invention for improving the operation of the antenna control circuits in the known radar system of Fig. 1.

As described previously, the speed of antenna rotation in the known radar system of Fig. 1 is controlled by the amount of positive voltage applied to the cathode of the control tube V3A through the associated circuits in the servo amplifier SA (Fig. 2). It is also possible to obtain the same effect by connecting a variable resistor in series between the cathode of that tube and ground, and adjusting the value of this resistor to vary the antenna speed. However, as illustrated in Fig. 3, in accordance with one feature of the present invention a much smoother control of the antenna speed in the known radar system of Figs. 1 and 2 or in that system modified to incorporate the arrangements of Fig. 6 is attained by substituting a vacuum tube V7 for the variable resistor in such a connection and applying a negative voltage of variable value to a control grid in the latter tube, say from a 150 volt source, through a variable resistor (potentiometer) R12, to control the plate-to-cathode resistance and thus the amount of conduction through that tube. In order to get sufficient speed of antenna rotation, it was also found advantageous in these systems to connect a supply of positive voltage (say, 150 volts) to an anode of the tube V7 through a variable resistor R13 of a value approximating 50,000 ohms, as illustrated in Fig. 3. As the anode resistance is increased with increase in the negative voltage applied to a grid of the tube V7, the potential of the anode of that tube approaches the voltage applied thereto which is in turn applied to the cathode of the control tube V3A. This results in less current flow through that tube which will give a substantial increase in the available antenna rotate speed. The particular tube selected for V7 should have a very low plate resistance in order to minimize any unbalance of the overload and antenna speed control circuits involved. For example, as illustrated in Fig. 3, a 6AS7 tube having two parallel-connected triode sections may be selected for V7, the selected tube having a plate resistance of 280 ohms per section or a theoretical value of 140 ohms with both sections (triodes) in parallel.

Figure 4:
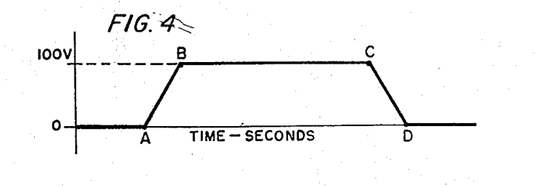
Fig. 4 shows in idealized form the voltage-time characteristic desired for the wave shaping and timing network in the arrangement of Fig. 5.
Figure 5:
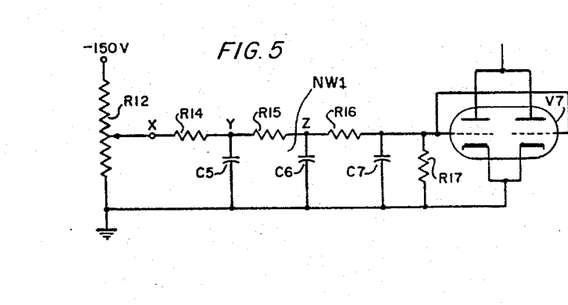

It would be desirable to apply the negative control voltage to the grids of the tube V7 in the antenna speed control circuit of Fig. 3 with a wave shape and timing that would prevent damage to the antenna by changes in its rotation speed. One wave shape which would accomplish this is a trapezoid such as illustrated in Fig. 4, which has a slope from A to B of about 2 to 3 seconds in length with a variable voltage rise of from zero to 100 volts, an equivalent opposite slope from C to D and is flat at 100 volts from B to C. The slopes A—B and C—D bring to mind the charge and discharge curves, respectively, of a capacitor, differing therefrom essentially in that the former must be flattened out in order to be useful in producing a steady increase and decrease in antenna speed. For this purpose, in accordance with a second feature of the present invention, in the known radar system of Figs. 1 and 2 and in that system modified to incorporate the arrangements in Fig. 6, a network NW1 having a voltage-time characteristic similar to that shown in Fig. 4, is preferably inserted between the grounded potentiometer R12 and the control grids of the tube V7 in the negative biasing voltage supply for that tube, as illustrated in Fig. 5. As shown, this network NW1 comprises three equal resistors R14, R15 and R16 connected in series between the variable voltage tap on potentiometer R12 and the grids of the tube V7, three equal capacitors C5, C6 and C7, respectively connected between a point between resistors R14 and R15, a point between resistors R15 and R16, and a point between resistor R16 and the grids of the tube, and ground, and a terminating resistor (2 megohms) R17 connected across the last capacitor C7 of the network. In operation, the network produce a voltage across the capacitor C7 which is as close to a straight line charge and discharge as was considered necessary. Capacitor C5 charges with a normal curve with the voltage at the point X remaining at one value. Capacitor C6 starts to charge normally starting with the voltage at the point Y. As capacitor C6 charges, however, this voltage is constantly increasing which results in a much flatter charging curve than obtained on capacitor C5. Similarly, the charge on capacitor C7 is also flattened out and results in the curve closely corresponding to the sloping portion between points A and B in the trapezoid of Fig. 4. The discharge curve is the result of the opposite action when capacitor C7 starts to discharge across the terminating resistor R17, but cannot follow the normal discharge rate due to the discharge of capacitors C6 and C5.

Figure 6:
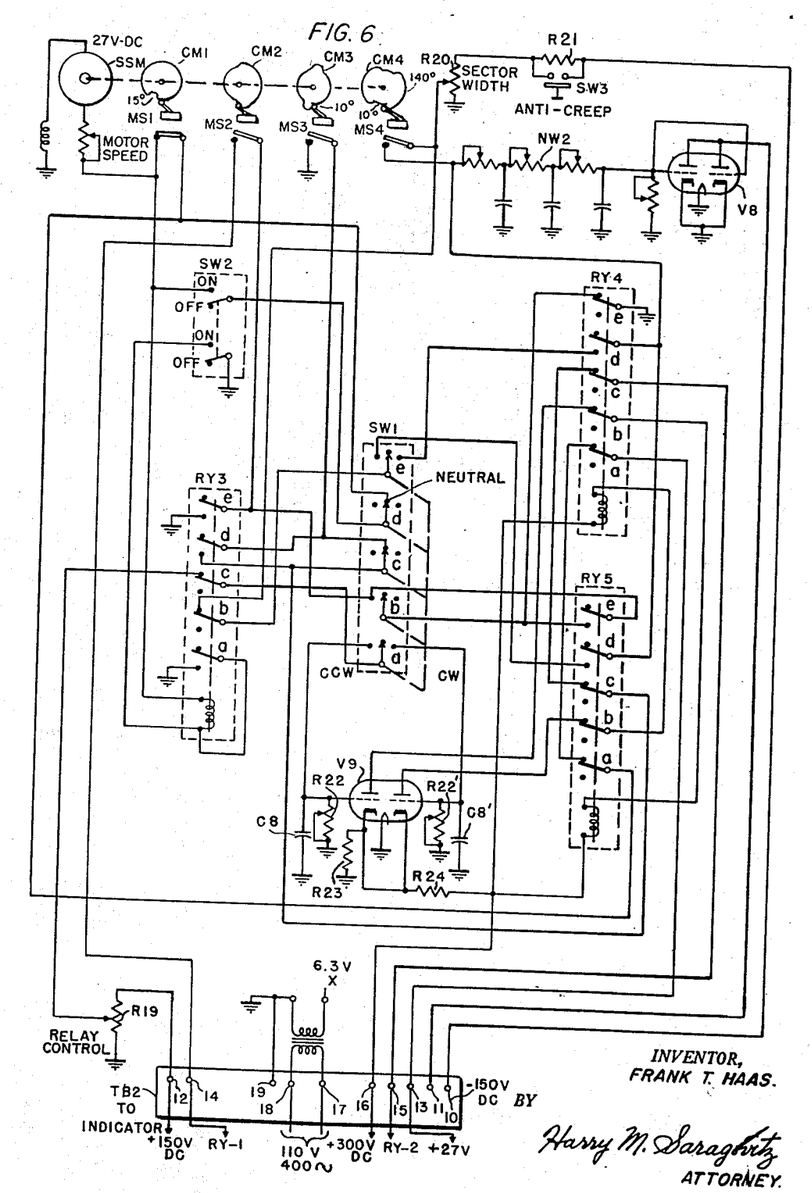
Fig. 6 shows schematically antenna scan control circuits in accordance with the invention adapted for application to a radar system such as shown in Fig. 1.

Fig. 6 shows schematically the circuits of an antenna scan control device in accordance with the invention adapted for use with the known radar system of Fig. 1 or with any similar pulse reflection type object locating system. When used with the known radar systems of Fig. 1, the antenna scan control device of the present invention shown in Fig. 6, including the terminal block TB2 and the circuit arrangements wired to its various terminals, represented diagrammatically in Fig. 1 by the dot-dash box designated SC, may be substituted for the equipment of that system having similar functions shown within that box, comprising the terminal block TB1 and the associated manual control apparatus MCA including the antenna rotation control switches S1 and S2, the antenna speed control potentiometer R9 and the variable resistor R10, the terminals 10 to 14 of the substituted terminal block TB2 being connected to the associated 150-volt D.C. source and the servo amplifier SA in the same manner as to the correspondingly-numbered terminals on terminal block TB1 in the unmodified system. Alternatively, the second terminal block TB2 of the device of Fig. 6 would be eliminated from the substituted device and the circuit arrangements shown in that figure as associated with differently numbered terminals of TB2 would be permanently wired to correspondingly-numbered terminals of the terminal block TB1 in the known radar system of Fig. 1 in place of the manual control apparatus MCA (including S1, S2, R9 and R10) which then would be disconnected from TR1.

The device of Fig. 6 includes as main elements: an auxiliary sector scan D.-C. motor SSM with its associated variable resistor used for motor speed control; four cams CM1, CM2, CM3 and CM4, each with an associated microswitch MS1, MS2, MS3 and MS4, respectively, these cams being attached to the shaft of motor SSM so that when that motor is operatively energized from a 27 volt D.-C. source through terminal 13 on the terminal block TB2, these cams will be rotated at a desired speed (say, 3 to 4 revolutions per minute); two manual multi-contact switches SW1 and SW2; three multi-contact control relays RY3, RY4 and RY5; two control vacuum tubes V8 and V9; a wave shaping-timing network or delay line NW2 (similar to the network NW1 in Fig. 5) in the grid biasing circuit of tube V8; the relay control variable resistor or potentiometer R19; sector scan width variable resistor or potentiometer R20; and manual "anti-creep" switch SW3 with its associated resistor R21. The rotation of each of the cams CM1 to CM4 is timed to provide one complete cycle of scanning operation, i.e., to start in one direction, run for a predetermined time, slow down to a stop, reverse, start in the opposite direction, run a while and then slow down to a stop.

The exact dimensions of the cams CM1 to CM4 and of the rise and fall of their curved surfaces depend on the design of their associated microswitches. In the preferred design for application to the known radar system illustrated in Fig. 1 in the manner described previously, each cam would have a diameter of approximately one inch and a rise and fall of about ⅛ inch each of its curved surfaces. The action point for each cam (make or break of the associated microswitch) is considered to be half way between the rise and fall dimensions. Also, each of the microswitches MS1 to MS4 would be constructed so that it would make contact on the rise action (movement away from the cam center) and break on the fall action.

The cams CM1 to CM4 would have the following actions if they are all fastened to the shaft of the scan motor SSM with their zero-degree points at corresponding positions and are synchronously rotated in a counter-clockwise direction.

Cam CM1 will open its microswitch MS1 once slightly prior to the end of each rotation (or cycle). If the associated switch SW2 has been turned off (by moving its switch arms to the lower contacts) at any time during the cycle, the opening of the microswitch MS1 at the end of the cycle will result in the opening of the power supply circuit from the 27-volt source through terminal 13 to the scan motor SSM and to the relay R3, thereby bringing the circuits to a standby condition. If switch SW2 is still turned on at the time microswitch MS1 is opened by cam CM1, this action will have no effect on the operation of the antenna control circuits.

Cam CM2 and its associated microswitch MS2 operate as a replacement for the manual switch S2 in MCA (Fig. 1) to control the direction of rotation of the antenna drive motor ADM and thus of the antenna RA. As shown in Fig. 6, the action of the cam CM1 precedes that of cam CM2 by 10 angular degrees which gives cam CM1 time before the next cycle starts to open its associated microswitch MS1 for the purpose of opening the 27-volt power supply circuit, provided SW2 has been opened previously. The cam CM2 is so shaped as to close its microswitch MS2 for 180 degrees of its cycle and to open it for the remaining 180 degrees, which results in rotation of the antenna RA once in each direction during each cycle.

The cam CM3 and its associated microswitch MS3 operate as a replacement for the manual control switch S1 in the manual control apparatus MCA (Fig. 1), to control operation of the relay RY2(A/B) which discharges the capacitors C3 and C4 in the antenna motor circuit (Fig. 2). This action is so timed that the discharge relay RY2(A/B) is activated immediately after the antenna has stopped and is waiting for the circuits to shift rotation in the opposite direction. This will happen twice in each cycle as controlled by the two humps in the surface of the cam CM3.

The function of the cam CM4 with its associated microswitch MS4 is to time the application of power to the antenna rotation control circuits in synchronization with the operation of the other cams. They do this by controlling the application of negative voltage power (150 volts D.-C.) applied to terminal 10 of terminal block TB2, through the delay line or wave shaping and timing network NW2, to the grids of the tube V8 (preferably a 6AS7 tube having two triodes connected in parallel is used for this tube) to produce operation of that tube which in turn controls the application of power through terminal 11 of terminal block TB2 and the servo motor SA (Fig. 2) to the antenna drive motor ADM. Cam CM4 is so shaped that, as cam CM2 and associated microswitch MS2 determine the direction of rotation, at the same moment cam CM4 through its microswitch MS4 will cause power to be applied to the antenna drive motor ADM. Cam CM4 will release this power in time for the rotating antenna RA to come to a halt just before cam CM3 and associated microswitch MS3 cause the capacitors C3 and C4 in the antenna motor control circuit (Fig. 2) to be shorted out in preparation for the next power application. It will be seen that power is applied to the antenna drive motor ADM once for each direction of rotation during each cycle.

The functions of the other apparatus in the antenna scan control device of Fig. 6 will be brought out in the following complete description of the operation of the device applied to the radar system of Figs. 1 and 2, first for producing normal clockwise and counter-clockwise 360-degree rotation of the antenna RA, and then for sector scan operation.

*Clockwise and counter-clockwise rotation—Normal*

Clockwise and counter-clockwise rotation of the antenna drive motor ADM and thus of the antenna RA is primarily controlled by manual operation by the radar operator of switch SW1 to the right-hand and left-hand switching contacts, respectively. It accomplishes this by controlling the operation (off-on) of the relays RY4 and RY5, which for convenience hereinafter will be referred to as the clockwise and counter-clockwise relays, respectively. When the switch SW1 is turned to its right-hand (CW) contacts, power (+150 volts D.-C.) is applied from terminal 12 of TB2 through relay control potentiometer R19, normally closed contacts of section *c* of relay RY3, and closed contacts in section *a* of switch SW1 to the control grid of the right-hand triode of tube V9. Both sections (triodes) of the tube V9 are normally at cut-off due to the positive voltage (about 25 volts) obtained from the voltage divider resistances R23, R24 in the cathode circuit of the tube supplied from the +300 volt source through terminal 16 of terminal block TB2. The anodes of the two triode sections of the tube V9 are normally supplied with plate voltage from the +300 volt. D.-C. source connected to the terminal 16 of the terminal block TB2, through the winding of relay RY5 and normally made contacts in section *b* of unoperated relay RY4, and through the winding of relay RY4 and normally made contacts in section *b* of the unoperated relay RY5, respectively. The cathode heaters of each of the tubes V8 and V9 are supplied with 6.3 volts heating power from the transformer powered from the 110-volt, 400-cycle alternating source connected across terminals 17 and 18 of terminal block TB2. The placing of the positive voltage on the grid of the right-hand triode of tube V9 overcomes the large bias thereon to the point where sufficient current flows through the right-hand triode section and the winding of clockwise relay RY4 to operate that relay (the windings of relays RY4 and RY5 each have a resistance of 10,000 ohms and enough current can be passed by a triode section of a 12AU7 tube to operate a relay of this type). Once relay RY4 has been operated, counter-clockwise relay RY5 cannot be operated because its power supply circuit which passes through normally made contacts in section *b* of the relay RY4 are opened by operation of the latter relay. Thus, it is impossible even by turning switch SW1 to the left-hand (CCW) contacts to reverse the direction of the antenna drive motor ADM and thus the rotation direction of the antenna RA suddenly. A similar action takes place when the switch SW1 is turned to its left-hand (CCW) contacts, in which case the resultant operation of the counter-clockwise relay RY5 in response to the current flowing to its winding, opens normally made contacts in its section *b* to open the power circuit to the winding of the relay RY4, so that the latter relay cannot be operatively energized until relay RY5 is released.

The action of the switch SW1 in controlling the direction of rotation of the antenna RA can be summarized as follows. The switch SW1 can be turned to either the right-hand (CW) contacts or the left-hand (CCW) contacts which will respectively cause the antenna drive motor ADM and thus the antenna RA to revolve in the corresponding direction as long as the switch remains in the operated position. When a direction change in the rotation of the antenna RA is desired, the switch SW1 would be operated to its opposite (CCW or CW) setting at which time the positive voltage (+150 volts) is disconnected from the grid circuit of the triode section of tube V9 involved. This grid voltage does not drop to zero immediately because of the time delay of the large capacitor C8 or C8' (2 mf.) connected across each (2.5 megohms) grid resistor R22 or R22' of the tube V9. The capacitor (C8 or C8') discharges slowly resulting in a short time delay (2 to 3 seconds) before the relay RY5 or RY4 in the corresponding plate circuit is released. This specific time delay should be preferably adjusted to one-half second longer than the time required to bring the antenna RA to a halt from full speed. Thus, the antenna RA will be fully stopped before either the RY4 or RY5 relay is electrically released. As the controlling relay RY4 or RY5 is released, its released contacts will automatically close the +300 volt power circuit from terminal 16 to the operating winding of the other relay. Since switch SW1 has already been set for the opposite direction of rotation, the power circuit for the relay controlling the new direction of rotation is operatively energized causing the antenna RA to proceed to gain speed in the new direction of rotation. To stop the antenna RA completely, the switch arms of switch SW1 would be returned by the operator to the Neutral position which will cause the positive control voltage to be disconnected from both grids of the tube V9. This, in turn, will cut off energizing current from the windings of relays RY4 and RY5 which cause certain made contacts in these relays to be released to cut off the power supply to the grids of the antenna speed control tube V8 which will cause the rotation of the antenna RA to be stopped.

Experiments have indicated that a 2 to 3 second charge and discharge time for the capacitors in the delay network NW2 in the grid supply circuit for the tube V8 will provide sufficient time for the antenna RA to start and stop, provided the sector width control potentiometer R20 (the adjustment of which actually controls the rotation speed of the antenna) is not set too high. In practice, this potentiometer control R20 would probably have to be limited in size so as not to permit a speed in excess of approximately 8 revolutions per minute, which has been found, in any case, to be a sufficient and good working speed for the antenna in the radar system for which the antenna scan control modification of the invention was devised. In practice, even lower speeds are desirable when searching for targets at extreme range due to the possibility of skipping over targets if the rotation speed is too great.

It should be mentioned here that when the switching arms of the switch SW1 are in either the CW or CCW positions, switching section *a* of either the relay RY4 or RY5, depending on which is in control of the rotation of the antenna, opens to disable the 27 volts D.-C. power supply circuit for the operating winding of the relay RY3 and the sector scan motor SSM from terminal 13 of terminal block TB2 which is used for sector scanning, thereby disabling the sector scan control circuit whenever the antenna is being rotated normally over the 360-degree scan angle. Switching section *e* in each relay RY4 and RY5 controls the direction of rotation, and switching section *d* of each of these relays applies power whenever the relay is actuated, through network NW2 to the control grid circuit of the tube V8 in the antenna speed control circuit. Switching section *c* in each relay RY4 and RY5 takes over the action of actuating the relay RY2-(A/B) (in the servo amplifier circuit SA in Fig. 2) which discharges the capacitors C3 and C4 in the antenna motor control circuit whenever the antenna RA stops, and switching sections *b* of the two relays RY4 and RY5 are so interlocked as to prevent the other relay from operating once one of these relays has operated.

*Sector scan operation*

When sector scan is desired, the switch arms of switch SW1 must be in the Neutral position or it will be impossible to actuate the sector scan motor SSM due to the power being disconnected therefrom by the opening of switching section *a* of either of the relays RY4 or RY5. The power supply circuit for the motor SSM and relay RY3 will not be closed unless both relays RY4 and RY5 are de-energized, the time delay therein has elapsed and switch SW1 is in Neutral position. Once this condition is established, the sector scan switch SW2 will take control. Turning switch SW2 to On (switch arm on upper contacts) closes the operating power supply circuit for sector scan motor SSM and applies +27 volts power to the winding of relay RY3 through section *a* of relays RY4 and RY5 from terminal 13 of TB2 and section *d* of SW1. As the motor SSM turns its cam shaft the cams CM1 to CM4 fastened thereto are rotated. As previously described these cams are so timed as to control their associated microswitches MS1 to MS4, respectively, and thus the rotation of the antenna drive motor ADM so that the antenna RA starts in one direction, runs for a moment, then slows to a stop; and then to shift the circuits so that the motor ADM reverses to start the antenna RA moving in the opposite direction in which it will run a short time and then again come to a halt. This results in a sector scan of a desired width (angle) which can be controlled by adjustment of the sector width control potentiometer R20 which actually controls the speed of rotation and thus the amount of rotation that will take place before the rotating cams slow down and reverse the direction of rotation. Once the sector scan motor SSM is started, it will not stop due to the interlock action between microswitch MS1 and upper contacts of switch SW2 until a complete cycle has been completed and cam CM1 has come around and opened its associated microswitch MS1. Sector scanning will continue until switch SW2 is turned to the Off (lower) contacts. Then, when cam CM1 opens its associated microswitch MS1, power is disconnected from the sector scan motor SSM and also from relay RY3, and the circuit is again in the rest condition.

Relay RY3, when actuated, opens the power circuit to the relays RY4 and RY5 which extends through switching section *c* of relay RY3. When section *c* of relay RY3 is open, no power can be applied to relay RY4 or RY5, no matter what the position of the switch arm of switch SW1. The switch SW1 has no control over any of the circuits when switch SW2 has been actuated first. Section a of relay RY3, when that relay is operated, acts as its own interlock holding that relay energized until both switch SW2 and microswitch MS1 have been opened, thereby releasing relay RY3. When relay RY3 is operated, its section b opens the power application circuit to the grid circuit of the tube V8 through delay line NW2, so that accidental operation of RY4 or RY5 cannot possibly affect the speed or rotation of the antenna RA. Section d of relay RY3, when that relay is operated, closes to lock in the relay control circuit through microswitch MS3, which controls relay RY2 to short circuit the capacitor C3 and C4 in the energizing circuit of the antenna drive motor ADM (in servo amplifier SA in Fig. 2). Switching section e of relay RY3, when that relay is operated, closes the antenna direction control circuit through microswitch MS2, which controls the direction control relay RY1 (in the servo amplifier SA in Fig. 2).

Cam CM2 should be so set that the first scanning direction resulting when it closes its associated microswitch MS2 is counter-clockwise. It is then possible to search with the antenna RA rotating in a clockwise direction, and when a possible target is picked up, switch SW1 can be turned to Neutral and switch SW2 to its On (upper) contacts which will result in the antenna RA first turning at a point beyond the target and stopping (due to the action of switch SW2); then to begin to sector scan over the suspected target by first reversing the antenna direction so that it will go back over the area in which the target was first observed and then will swing back and forth over that same area. The sector width (angle) for normal purposes can be controlled sufficiently by adjustment of the position of the variable contact on the sector width control potentiometer R20, the exact angle of coverage depending largely on the size of that potentiometer. The speed of the sector scan motor SSM with its cam shaft will also contribute to the control of sector scan width along with the frequency of the scan over a given area. In practice, it is doubtful if a sector scan of more than 90 degrees will be needed, but in special cases the speed of the sector scan motor SSM and the speed of rotation of its cam shaft could be slowed down to permit more scanning time per scan resulting in a larger angle being covered. Local requirements would govern the setting of the motor speed potentiometer R18. It would also be possible, if it was considered necessary, to substitute a tandem control (not shown) for the two potentiometer controls R18 and R20 which would allow both the speed of the motor SSM and the sector width (angle) at the same time to be controlled by the turning of a single knob, both speed and sector width compensating for each other as the control knob is turned.

A complete model of the antenna scan control arrangement in accordance with the invention as shown in Fig. 6 was constructed by applicant and was tested experimentally with a radar system of the type illustrated in Figs. 1 and 2, with excellent results:

(a) Scanning of sectors up to 180 degrees or more were obtained by adjustment of potentiometer R20 for the sector width desired;

(b) Normal rotation of the antenna RA in either clockwise or a counter-clockwise direction was easily obtained by proper adjustment of the setting of switch SW1;

(c) As planned, whenever the radar antenna RA was rotating in one direction, all the switches could be thrown at random (which operators in the field often do) without any damage to the antenna RA due to the safety delays incorporated in the arrangement as described previously, and this was also true when the arrangement was operated for sector scan;

(d) Smooth operation was obtained when the variable resistors in the grid voltage wave shaping network NW2 for the tube V8 had values of approximately 1.5 megohms each;

(e) The anti-creep circuit, which was included in the constructed arrangement in accordance with Fig. 6, operated perfectly. By pressing the "anti-creep" switch SW3 to short-circuit the associated resistor R21 (10,000 ohms), the sector of scan could be made to shift up to about 5–10 degrees in either direction depending on when it was pressed. Pressing this switch SW3 speeds up the antenna rotation in the direction in which the antenna is rotating at the time the switch is pressed. This switch could also be utilized to keep a specific target centered within the sector being scanned regardless of the speed of the target until it came within approximately 5 miles of the radar set (as very high speeds).

Modifications of the antenna scan control circuits illustrated and described, other than those discussed above, which are within the spirit and scope of the invention will occur to persons skilled in the art.

What is claimed is:

1. A system for causing a rotatable antenna to scan through any desired sector of an available 360-degree scanning angle, including a reversible motor having a power supply circuit, for rotating said antenna, relay means which in one operating position conditions said motor to rotate said antenna in one direction and in another operating position conditions said motor to rotate said antenna in the opposite direction, an auxiliary motor having a shaft, a plurality of cams attached to said shaft so as to be rotated thereby at a predetermined speed when said auxiliary motor is operating, an individual switch controlled by each of said cams, a manual switch having "on" and "off" contacts, means responsive to operation of said manual switch to the "on" contacts to cause operating power to be supplied to said auxiliary motor and responsive to operation of said manual switch to the "off" contacts to cause operating power to be disconnected from said auxiliary motor, said cams being so shaped and dimensioned that when said auxiliary motor is operating they will actuate their individual switches in a predetermined time relationship, said individual switches being so connected to the power supply circuits for the first motor and said relay means that when actuated in said predetermined time relationship they will cause operating power to be applied to and removed from said first motor and said relay means in such manner as to provide, for each rotation of said cams, cyclical scanning of said antenna back and forth over the desired sector, and potentiometer means in said power supply circuit for said first motor for adjusting the speed of scanning and the angular width of the sector scanned.

2. The antenna scanning system of claim 1, in which an electron discharge device having a cathode, an anode and a control grid, is inserted in the power supply for said first motor, a positive biasing voltage is applied to the cathode of said device to control the speed of said motor and thus the speed of rotation of said antenna in accordance with the amount of applied positive voltage, and to provide a smoother control of the speed of rotation of said antenna and prevent damage thereto due to sudden changes in speed, a second electron discharge device having a cathode, an anode and a control grid, is inserted in series between the cathode of the first device and ground, a delay line having a trapezoidal voltage-time characteristic is connected in series between said potentiometer means and the control grid of said second device, and a negative biasing voltage is applied to the control grid of said second electron discharge device through said potentiometer means and said delay line to control the amount of conduction in said second device and thus the positive voltage on the cathode of said first device in accordance with the setting of said potentiometer means.

3. A system for causing a rotatable antenna to scan cyclically through any desired sector of the available 360-degree scanning angle, including a reversible motor for rotating said antenna, relay means which, when unoperated conditions said motor for rotating said antenna in one direction and when operated conditions the motor for rotating said antenna in the opposite direction, an auxiliary motor having a shaft, a plurality of cams attached to said shaft so as to be rotated thereby at a predetermined speed when said auxiliary motor is supplied with operating power, an individual switch controlled by each of said cams, a manual switch having "off" and "on" positions, means responsive to operation of said manual switch to the "on" position to cause operating power to be supplied to said auxiliary motor and responsive to operation of said manual switch to the "off" position to cause the operating power to be disconnected from said auxiliary motor, said cams being shaped and dimensioned so that when said auxiliary motor is operating they will actuate their associated individual switches in a predetermined timed relationship, said individual switches being so connected to the power supply circuit for the first motor and said relay means that when actuated by their associated cams in said predetermined timed relationship, operating power will be applied to or removed from said first motor and said relay means in such manner as to provide, for each rotation of said cams, one complete cycle of scanning operation in which said antenna first starts to rotate in one direction, continues rotating in that direction for a predetermined time interval, then slows down to a complete stop, reverses to start rotating in the opposite direction, continues rotating in said opposite direction for a predetermined time interval and then again slows down to a complete stop, and potentiometer means in the power supply for said first motor for adjusting the amount of power supplied thereto to vary the speed of rotation and the angular width of the sector scanned by said antenna.

4. A scanning control system for a rotatable antenna, including a reversible motor for rotating said antenna, relay means which when unoperated conditions said motor for rotating said antenna in one direction and when operated conditions said motor for rotating said antenna in the opposite direction, a manual switch having switch arms and two sets of operating switching contacts, a pair of relays each having an operating winding and a plurality of switching contacts, a space discharge device comprising two triodes each having a cathode, an anode and a grid, connected in parallel, said triodes of said device being normally biased to cut-off, means responsive to operation of the switch arms of said manual switch to one set of operating contacts to apply a positive biasing voltage to the grid of one of said triodes of said device such as to render that triode operative to supply operating current to the winding of one relay in said pair causing operation of that relay, means responsive to the operation of the switch arms of said manual switch to the other set of operating contacts to supply operating current to the winding of the other relay in said pair causing the operation of that relay and means responsive to the operation of said one relay in said pair for controlling the power supply to said motor and said relay means so that said motor will be conditioned for rotating said antenna in said one direction and responsive to operation of the other relay in said pair for controlling the power supply to said motor and said relay means so that said motor will be conditioned for rotating said antenna in said opposite direction.

5. The antenna scanning system of claim 3, in which one of said cams is so shaped that it actuates its individual switch once during each rotation or cycle, each such switch actuation causing the power circuit to said auxiliary motor to be opened for this interval thereby bringing the system to a standby condition, but only if said manual switch has been operated to the off position at some time during the cycle; a second one of said cams controls the direction of antenna rotation, being so shaped that it actuates its individual switch with a predetermined angular lag with respect to the actuation by said one cam of its individual switch, once during each cycle, each such switch actuation operating on the power circuit controlling said relay means so that it conditions said first motor to rotate said antenna once in each direction during each cycle; and a third one of said cams controls the application of power to said first motor driving said antenna, being so shaped that it actuates its individual switch twice during each cycle, such switch actuations resulting in the application of power to said first motor at the moment said second cam and its individual switch determines the direction of rotation, and the release of that power in time for said antenna to be brought to a halt before the next application of power to the motor.

6. A system for causing a rotatable antenna alternatively to scan cyclically through a 360-degree angle or through a sector of that angle of any desired angular width, including a reversible motor for rotating said antenna, first relay means which when unoperated conditions said motor for rotating said antenna in one direction and when operated conditions said motor for rotating said antenna in the opposite direction, one manual switch having "on" and "off" positions, a second manual switch having ganged switch arms, neutral contacts and two sets of operating contacts, a second, third and fourth relay means each having an operating winding and a plurality of contacts, an auxiliary motor having a shaft, a plurality of cams attached to said shaft so as to be rotated thereby at a predetermined speed when said auxiliary motor is supplied with operating power, an individual switch controlled by each of said cams, means responsive to the operation of said one manual switch to the "on" position, but only if the switch arms of said second manual switch are on the neutral contacts thereof, to cause operating power to be supplied to said auxiliary motor and to the operating winding of said second relay means, and responsive to operating of said one manual switch to the "off" contacts to disconnect operating power from said auxiliary motor and said winding of said second relay means, said cams being shaped and dimensioned so that their rotation by said shaft when said auxiliary motor is operating will cause their associated individual switches to be actuated in a predetermined time relationship, said individual switches being so connected with the power supply circuit for the first motor and said first relay means that when actuated by their associated cams in that time relationship, operating power will be applied to or removed from said first motor and said first relay means in such manner as to provide, for each rotation of said cams, one complete cycle of sector scanning operation, means responsive to operation of said second manual switch to one set of operating contacts to cause operating power to be supplied to said first motor and the operating winding of said third relay means to operate that relay means, and responsive to operation of said second manual switch to the other set of contacts to cause operating power to be supplied to said first motor and to the winding of said fourth relay means to operate that relay means, means responsive to operation of said third relay means for controlling the power supply to said first relay means so that it will condition the first motor for rotating said antenna in said one direction and responsive to operation of said fourth relay means for controlling the power supply to said first relay means so that it will condition said first motor for rotating said antenna in the opposite direction, and potentiometer means in the power supply circuit to said first motor for adjusting the amount of power supplied thereto to vary the speed of antenna rotation and the angular width of the sector scanned by said antenna.

7. The system of claim 6, in which one of said cams is so shaped that it actuates its individual switch once during each rotation or cycle, which, only if said first manual switch is operated to its "off" position at any time during the cycle, will cause the power supply circuit to said auxiliary motor and said second relay means to be opened bringing the sector-scan control circuit to a standby condition; a second one of said cams is so shaped that it actuates its individual switch with a predetermined angular lag with respect to the actuation by said one cam of its individual switch once during each cycle, which will cause the power circuit controlling said first relay means to condition said first motor so that it rotates said antenna once in each direction during each cycle; and a third one of said cams is so shaped that it actuates its individual switch twice during each cycle, which causes in each case, the application of power to said first motor at the moment said second cam and its individual switch determines the direction of rotation of the antenna, and the release of that power in time for said antenna to be brought to a halt before the next application of power to said first motor.

8. The antenna scanning control system of claim 6, in which the operation of said second relay means in response to operation of said first manual switch to its "on" contacts will cause the power supply circuits to said third and fourth relay means to be opened regardless of the operating position of said second manual switch; will close an interlock circuit for its own winding holding said second relay means operated until both said one manual switch has been operated to its "off" contact and the individual switch controlled by one of said cams has opened to release power from said auxiliary motor and said second relay means; will open the power application circuit to said first motor; and will close the power supply circuit to said first relay means through the individual switch of the one of said cams which controls said first relay means to determine the direction of rotation of said antenna.

9. The antenna scanning control system of claim 6, in which means is provided in the power supply circuit to each of said third and fourth relay means for delaying the application of power thereto for a predetermined time interval after the switch arms of said second manual switch have been operated to said one and said other set of operation contacts, respectively, and the windings and certain contacts of said third and fourth relay means are interlocked in such manner that the operation of either one of these relay means in response to operation of the switch arms of said second manual switch to either set of contacts thereof to determine the direction of rotation of said antenna, will prevent operation of the other relay means in response to operation of the switch arms of said second manual switch to its other set of contacts to reverse the direction of antenna rotation until a given time after the power supply circuit to the first relay means has been opened.

10. The antenna scanning control system of claim 6, in which the power supply circuit to said third and fourth relay means includes a space discharge device consisting of two triodes each having a cathode, an anode, and a grid, connected in parallel, which triodes are normally biased to cut-off, the operation of the switch arms of said second manual switch to one set of operating contacts causes a positive voltage of sufficient value to overcome this normal bias to be applied to the control grid of one of said triodes and render that triode operative to supply operating voltage to the winding of said third relay means to operate that relay means, the operation of the switch arms of said second manual switch to its other set of operating contacts causes a positive voltage of sufficient value to overcome the normal bias to be applied to the grid of the other triode to render that triode operative to supply operating voltage to the winding of said fourth relay means to operate that relay means, and individual resistance shunted by an individual large capacitor is connected between the grid and cathode of each of said triodes each said capacitor operating as delay means to prevent the grid voltage from dropping to zero immediately after the positive voltage is removed from the grid of the associated triode so as to prevent the relay means controlled by that triode from releasing until the antenna has been brought to a full stop.

11. The antenna scanning control system of claim 6, in which an electron discharge device having a cathode, anode and grid is inserted in the power supply for said first motor, a positive biasing voltage is applied to the cathode of that device to control the speed of rotation of said motor and thus of said antenna in accordance with the amount of applied positive voltage, a second electron discharge device having a cathode, an anode and a grid, is connected in series between the cathode of the first device and ground, a delay line having a trapezoidal-shaped voltage-time characteristic is connected in series between said potentiometer means and the grid of said second device and a negative voltage is applied to the grid of said second device through said potentiometer means and said delay line to provide smooth control of the amount of conduction of said second device and thus the positive voltage applied to the cathode of said first device in accordance with the setting of said potentiometer means.

12. The antenna scanning control system of claim 6, in which to compensate for any drift in sector direction, an anti-creep circuit consisting of a resistor of predetermined value and a third manual switch having its operating contacts connected across said resistor, is inserted in series with said potentiometer means in the power supply to said first motor, the operation of said third manual switch to short-circuit said resistor enabling the sector to be shifted up a predetermined number of degrees in either direction, depending on when said switch is operated, to speed up the antenna rotation in that direction by a desired amount.

References Cited in the file of this patent
UNITED STATES PATENTS

| | | |
|---|---|---|
| 2,119,337 | Lockett | May 31, 1938 |
| 2,547,363 | Bishop | Apr. 23, 1951 |
| 2,589,813 | Hulsizer | Mar. 18, 1952 |
| 2,605,453 | Miller | July 29, 1952 |
| 2,648,038 | Morse et al. | Aug. 4, 1953 |
| 2,680,223 | Hammett | June 1, 1954 |
| 2,686,284 | Sher | Aug. 10, 1954 |
| 2,769,123 | Fegely | Oct. 30, 1956 |
| 2,776,396 | Gille | Jan. 1, 1957 |